(12) United States Patent
Jing et al.

(10) Patent No.: US 8,326,091 B1
(45) Date of Patent: Dec. 4, 2012

(54) RANKING OF IMAGES AND IMAGE LABELS

(75) Inventors: Yushi Jing, Mountain View, CA (US); Shumeet Baluja, Leesburg, VA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/103,258

(22) Filed: May 9, 2011

Related U.S. Application Data (63) Continuation of application No. 12/164,808, filed on Jun. 30, 2008, now Pat. No. 7,961,986.

(51) Int. Cl.
*G06K 9/60* (2006.01)

(52) U.S. Cl. . 382/305; 382/311; 707/752; 707/999.003; 707/999.007

(58) Field of Classification Search .......... 382/145, 382/305, 306, 311; 704/10; 707/3, 5, 7, 707/104.1, 752
See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,848,397 A | 12/1998 | Marsh et al. |
| 5,913,205 A * | 6/1999 | Jain et al. ............... 1/1 |
| 5,918,014 A | 6/1999 | Robinson |
| 5,948,061 A | 9/1999 | Merriman |
| 5,991,429 A | 11/1999 | Coffin et al. |
| 6,009,422 A | 12/1999 | Ciccarelli |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman et al. |
| 6,167,382 A | 12/2000 | Sparks et al. |
| 6,256,648 B1 | 7/2001 | Hill et al. |
| 6,269,361 B1 | 7/2001 | Davis et al. |
| 6,356,659 B1 | 3/2002 | Wiskott et al. |
| 6,389,372 B1 | 5/2002 | Glance et al. |
| 6,401,075 B1 | 6/2002 | Mason et al. |
| 6,549,896 B1 | 4/2003 | Candan et al. |
| 6,594,673 B1 | 7/2003 | Smith et al. |
| 6,721,733 B2 | 4/2004 | Lipson et al. |
| 6,792,419 B1 | 9/2004 | Raghavan |
| 6,816,836 B2 | 11/2004 | Basu et al. |

(Continued)

FOREIGN PATENT DOCUMENTS

EP 1 544 729 6/2005

(Continued)

OTHER PUBLICATIONS

Accounts, at http://www.cs.rice.edu/~ssiyer/accounts/, as available via the Internet and printed on Jul. 29, 2004.

(Continued)

*Primary Examiner* — Gregory M Desire (74) *Attorney, Agent, or Firm* — Fish & Richardson P.C.

(57) ABSTRACT

The subject matter of this specification can be embodied in, among other things, a method that includes determining a score for an image of a plurality of images with respect to each of one or more terms, identifying one or more of the terms for each of which the score for the image with respect to the respective identified term satisfies a criterion, and associating the identified terms with the image. Determining the score for the image with respect to a respective term includes determining probabilities of navigating between images in the plurality of images and determining the score for the image with respect to the respective term based on the probabilities.

20 Claims, 6 Drawing Sheets

U.S. PATENT DOCUMENTS

| | | | |
|---|---|---|---|
| 6,985,882 B1 | 1/2006 | Del Sesto | |
| 7,035,467 B2 | 4/2006 | Nicponski | |
| 7,039,599 B2 | 5/2006 | Merriman | |
| 7,136,875 B2 | 11/2006 | Anderson et al. | |
| 7,324,670 B2 | 1/2008 | Kozakaya et al. | |
| 7,492,943 B2 | 2/2009 | Li et al. | |
| 7,689,682 B1 | 3/2010 | Eldering et al. | |
| 7,701,608 B2 | 4/2010 | Katayama et al. | |
| 7,739,276 B2* | 6/2010 | Lee et al. | 707/723 |
| 7,765,218 B2 | 7/2010 | Bates et al. | |
| 7,801,907 B2* | 9/2010 | Fischer et al. | 707/758 |
| 7,801,956 B1 | 9/2010 | Cumberbatch et al. | |
| 7,809,163 B2 | 10/2010 | Sheu | |
| 7,831,595 B2* | 11/2010 | Suresh et al. | 707/721 |
| 7,853,622 B1 | 12/2010 | Baluja et al. | |
| 2002/0023230 A1 | 2/2002 | Bolnick et al. | |
| 2002/0116466 A1 | 8/2002 | Trevithick et al. | |
| 2002/0120506 A1 | 8/2002 | Hagen | |
| 2002/0124053 A1 | 9/2002 | Adams et al. | |
| 2003/0050977 A1 | 3/2003 | Puthenkulam et al. | |
| 2004/0042599 A1 | 3/2004 | Zaner et al. | |
| 2004/0088325 A1 | 5/2004 | Elder et al. | |
| 2004/0122803 A1 | 6/2004 | Dom et al. | |
| 2004/0143841 A1 | 7/2004 | Wang et al. | |
| 2004/0148275 A1 | 7/2004 | Achlioptas | |
| 2004/0202349 A1* | 10/2004 | Erol et al. | 382/100 |
| 2004/0215793 A1 | 10/2004 | Ryan et al. | |
| 2004/0267604 A1 | 12/2004 | Gross | |
| 2005/0043897 A1 | 2/2005 | Meyer | |
| 2005/0091202 A1 | 4/2005 | Thomas | |
| 2005/0114325 A1 | 5/2005 | Liu et al. | |
| 2005/0125308 A1 | 6/2005 | Puentes et al. | |
| 2005/0125408 A1 | 6/2005 | Somaroo et al. | |
| 2005/0144069 A1 | 6/2005 | Wiseman et al. | |
| 2005/0149395 A1 | 7/2005 | Henkin et al. | |
| 2005/0154639 A1 | 7/2005 | Zetmeir | |
| 2005/0159998 A1 | 7/2005 | Buyukkokten et al. | |
| 2005/0171832 A1 | 8/2005 | Hull et al. | |
| 2005/0198031 A1 | 9/2005 | Pezaris et al. | |
| 2005/0216300 A1 | 9/2005 | Appelman et al. | |
| 2005/0278443 A1 | 12/2005 | Winner et al. | |
| 2006/0004704 A1 | 1/2006 | Gross | |
| 2006/0031121 A1 | 2/2006 | Speicher | |
| 2006/0069584 A1 | 3/2006 | Bates et al. | |
| 2006/0085259 A1 | 4/2006 | Nicholas et al. | |
| 2006/0136098 A1 | 6/2006 | Chitrapura et al. | |
| 2006/0165040 A1 | 7/2006 | Rathod et al. | |
| 2006/0184617 A1 | 8/2006 | Nicholas et al. | |
| 2006/0190225 A1 | 8/2006 | Grand | |
| 2006/0200432 A1 | 9/2006 | Flinn et al. | |
| 2006/0200434 A1 | 9/2006 | Flinn et al. | |
| 2006/0200435 A1 | 9/2006 | Flinn et al. | |
| 2006/0204142 A1 | 9/2006 | West et al. | |
| 2006/0218577 A1 | 9/2006 | Goodman et al. | |
| 2006/0224675 A1 | 10/2006 | Fox et al. | |
| 2006/0247940 A1 | 11/2006 | Zhu et al. | |
| 2006/0248573 A1 | 11/2006 | Pannu et al. | |
| 2006/0271460 A1 | 11/2006 | Hanif | |
| 2006/0282328 A1 | 12/2006 | Gerace et al. | |
| 2006/0294084 A1 | 12/2006 | Patel et al. | |
| 2006/0294134 A1 | 12/2006 | Berkhim et al. | |
| 2007/0005341 A1 | 1/2007 | Burges et al. | |
| 2007/0043688 A1 | 2/2007 | Kountz et al. | |
| 2007/0043766 A1 | 2/2007 | Nicholas et al. | |
| 2007/0050446 A1 | 3/2007 | Moore | |
| 2007/0106551 A1 | 5/2007 | McGucken | |
| 2007/0121843 A1 | 5/2007 | Atazky et al. | |
| 2007/0124721 A1 | 5/2007 | Cowing et al. | |
| 2007/0156614 A1 | 7/2007 | Flinn et al. | |
| 2007/0192306 A1 | 8/2007 | Papakonstantinou et al. | |
| 2007/0203872 A1 | 8/2007 | Flinn et al. | |
| 2007/0203904 A1 | 8/2007 | Wang et al. | |
| 2007/0218900 A1 | 9/2007 | Abhyanker | |
| 2007/0288462 A1 | 12/2007 | Fischer et al. | |
| 2008/0010275 A1 | 1/2008 | Lee et al. | |
| 2008/0091834 A1 | 4/2008 | Norton | |
| 2008/0103784 A1 | 5/2008 | Wong et al. | |
| 2008/0103877 A1 | 5/2008 | Gerken | |
| 2008/0104079 A1 | 5/2008 | Craig | |
| 2008/0104225 A1 | 5/2008 | Zhang et al. | |
| 2008/0120308 A1 | 5/2008 | Martinez et al. | |
| 2008/0120411 A1 | 5/2008 | Eberle | |
| 2008/0126476 A1 | 5/2008 | Nicholas et al. | |
| 2008/0140650 A1 | 6/2008 | Stackpole | |
| 2008/0155080 A1 | 6/2008 | Marlow et al. | |
| 2008/0159590 A1 | 7/2008 | Yi et al. | |
| 2008/0162431 A1 | 7/2008 | Xu et al. | |
| 2008/0189169 A1 | 8/2008 | Turpin et al. | |
| 2008/0195657 A1 | 8/2008 | Naaman et al. | |
| 2008/0215416 A1 | 9/2008 | Ismalon | |
| 2008/0243607 A1 | 10/2008 | Rohan et al. | |
| 2008/0249966 A1 | 10/2008 | Luege Mateos | |
| 2008/0275899 A1 | 11/2008 | Baluja et al. | |
| 2009/0018918 A1 | 1/2009 | Moneypenny et al. | |
| 2009/0024548 A1 | 1/2009 | Zhu et al. | |
| 2009/0063284 A1 | 3/2009 | Turpin et al. | |
| 2009/0076800 A1 | 3/2009 | Li et al. | |
| 2009/0112701 A1 | 4/2009 | Turpin et al. | |
| 2009/0144075 A1 | 6/2009 | Flinn et al. | |
| 2009/0192967 A1 | 7/2009 | Luo et al. | |
| 2009/0248661 A1* | 10/2009 | Bilenko et al. | 707/5 |
| 2011/0219073 A1 | 9/2011 | Lawler et al. | |
| 2011/0268369 A1* | 11/2011 | Richards et al. | 382/284 |

FOREIGN PATENT DOCUMENTS

| | | |
|---|---|---|
| JP | 11-265369 | 9/1999 |
| JP | 2002-132604 | 5/2002 |
| WO | WO 97/21183 | 6/1997 |
| WO | WO 00/68860 | 11/2000 |
| WO | WO 2004/111771 | 12/2004 |
| WO | WO 2006/121575 | 11/2006 |

OTHER PUBLICATIONS

Adamic et al., "A Social Network Caught in the Web," at http://firstmonday.org/issues/issue8_6/adamic/, as available via the Internet and printed on Jul. 28, 2004.

AdForce, Inc., A Complete Guide to AdForce, Version 2.6, 1998.

AdForce, Inc., S-1/A SEC Filing, May 6, 1999.

AdKnowledge Campaign Manager: Reviewer's Guide, AdKnowledge, Aug. 1998.

AdKnowledge Market Match Planner: Reviewer's Guide, AdKnowledge, May 1998.

AdStar.com website archive from www.Archive.org, Apr. 12, 1997, and Feb. 1, 1997.

Amazon.com, "Selling at Amazon Marketplace," at http://pages.amazon.com/exec/obidos/tg/browse/-/1161234/ref=hp_hp_is_4_2/002-283572 as available via the Internet and printed on Jul. 29, 2004.

U.S. Appl. No. 95/001,061, Reexam of Stone.

U.S. Appl. No. 95/001,068, Reexam of Stone.

U.S. Appl. No. 95/001,069, Reexam of Stone.

U.S. Appl. No. 95/001,073, Reexam of Stone.

Amazon.com, "New Seller FAQ," at http://pages.amazon.com/exec/obidos/tg/browse/-/1161274/002-2835726-5513622 as available via the Internet and printed on Jul. 29, 2004.

Azran, "The Rendezvous Algorithm: Multiclass Semi-Supervised Learning with Markov Random Walks," *ICML*, 2007, 8 pages.

Baluja and Rowley, *Intl J Computer Vision*, 2007, 71(1): at http://portal.acm.org/toc.cfm?id=J325&type=periodical&coll=&dl=ACM&CFID=15151515&CFTOKEN=6184618.

Baluja et al., "Video Suggestion and Discovery for YouTube: Taking Random Walks Through the View Graph," *Proc. 17th International World Wide Web Conference (WWW)*, 2008.

Baseview Products, Inc., AdManager Pro Administrator's Manual v. 2.0, Jun. 1998.

Baseview Products, Inc., ClassManagerPro Administration and Receivables Manual v. 1.0.5, Feb. 1, 1997.

Bay et al., "SURF: Speeded up robust features," *Proc. 9th International European Conference on Computer Vision (ECCV)*, pp. 404-417, 2006.

Belongie et al., "Shape matching and object recognition using shape contexts," *IEEE Transactions on Pattern Analysis and Machine Intelligence (TPAMI)*, vol. 24, No. 24, pp. 509-522, 2002.

Boccaletti et al., "Complex Networks: 308 Structure and Dynamics," *Physics Reports*, 2006, 424:175-308.

Brin and Page, "The Anatomy of a Large-Scale Hypertextual Web Search Engine," *Computer Networks*, 1998, pp. 1-26.

Business Wire, "Global Network, Inc. Enters Into agreement in Principle with Major Advertising Agency," Oct. 4, 1999.

Carson et al., "Blobworld: Image Segmentation Using Expectation-Maximization and Its Application to Image Querying," *IEEE transactions on Pattern Analysis and Machine Intelligence (TPAMI)*, 2002, 24(8):1026-1038.

Chakrabarti et al., "Mining the Web's Link Structure," *IEEE Computer Magazine*, 1999, pp. 60-67.

Dalal and Triggs, "Histograms of Oriented Gradients for Human Detection," *Proc IEEE Conf Computer Vision and Pattern Recognition*, Jun. 2005, pp. 886-893.

Datar et al., "Locality-sensitive hashing scheme based on p-stable distributions," *Proc 20th Symposium on Computational Geometry (SCG)*, pp. 253-262, 2004.

Datta et al., "Image retrieval: Ideas, influences, and trends of the new age," *ACM Computing Surveys*, 2008, 40(2):.

Dedrick, Interactive Electronic Advertising, IEEE, 1994, pp. 55-66.

Dedrick, A Consumption Model for Targeted Electronic Advertising, Intel Architecture Labs, IEEE, 1995, pp. 41-49.

Dellaert et al., "Mixture Trees for Modeling and Fast Conditional Sampling with Applications in Vision and Graphics," *Proc IEEE Conf Computer Vision and Pattern Recognition*, 2005 at http://www.cs.unc.edu/~kwatra/publications/cvpr05-mixtree.pdf.

Doctorow, "Running Notes from Revenge of the User: Lessons from Creator/User Battles," at http://craphound.com/danahetcon04.txt, as available via the Internet and printed Jul. 28, 2004.

Ebay.com, "What is eBay?" at http://pages.ebay.com/help/welcome/questions/about-ebay.html as available via the Internet and printed on Jul. 29, 2004.

Ebay.com, "How to Bid," at http://pages.ebay.com/help/welcome/bid.html as available via the Internet and printed on Jul. 29, 2004.

Ebay.com, "How to Sell," at http://pages.ebay.com/help/welcome/sell.html as available via the Internet and printed on Jul. 29, 2004.

Facebook Press Release "Users Gain Ability to Share their Action from 44 Participating Sites with their Friends on Facebook" [online] [retrieved on Jan. 24, 2008] [retrieved from the internet: http://www.facebook.com/press/releases.php?p9166] 1 page.

Jessica Zhang , 'Facebook unveils school-specific advertisements' [online]. The Stanford Daily, 2005, [retrieved on Aug. 16, 2010]. Retrieved from the Internet: http://www.stanforddaily.com/2005/01/06/facebook-unveils-school-specific-advertisements/, (Jan. 6, 2005) 1 page.

Fergus et al., "A visual category filter for Google images," *Proc. 8th European Conference on Computer Vision (ECCV)*, 2004, pp. 242-256.

Fergus et al., "Object class recognition by unsupervised scale-invariant learning," *Proc. Conference on Computer Vision and Pattern Recognition (CVPR)*, 2003, 2:264-271.

Frey and Dueck, "Clustering by Passing Messages Between Data Points," *Science*, 2007, 315:972-976.

Friedman et al., "Bayesian network classifiers," *Machine Learning*, 1997, 29:131-163.

Frome et al., "Learning globally-consistent local distance functions for shape-based image retrieval and classification," *Proc. 11th IEEE International Conference on Computer Vision (ICCV)*, pp. 1-8, 2007.

Gibson et al., "Inferring Web Communities from Link Topology," *Proc 9th ACM Conference on Hypertex and Hypermedia*, 1998, 10 pages.

Gionis et al., "Similarity Search in High Dimensions via Hashing," *Proc 25th Very Large Database Conf*, 1999 at people.csail.mit.edu/indyk/vldb99.ps.

Glance et al., "Knowledge Pump: Supporting the Flow and Use of Knowledge," *Information Technology for Knowledge Management*, 1997, Borghoff and Pareschi (eds.), Springer Verlag, 22 pages.

Grauman and Darrell, "The Pyramid Match Kernel: Discriminative Classification with Sets of Image Features," *ICCV 2005* at http://people.csail.mit.edu/kgrauman/jobapp/kgrauman_sample_papers.pdf.

Harris and Stephens, "A combined corner and edge detector," *Proc. 4th Alvey Vision Conference*, pp. 147-151, 1988.

Haveliwala, "Topic-Sensitive PageRank," *IEEE Transactions on Knowledge and Data Engineering*, 2003, 10 pages.

He et al., "Imagerank: spectral techniques for structural analysis of image database," *Proc. International Conference on Multimedia and Expo*, 2002, 1:25-28.

Herlocker et al., "Evaluating Collaborative Filtering Recommender Systems," *ACM Transactions on Information Systems*, 2004, 22(1):5-53.

Hsu et al., "Video search reranking through random walk over document-level context graph," *Proc. 15th International Conference on Multimedia*, 2007 pp. 971-980.

Indyk and Motwani, "Approximate Nearest Neighbors: Towards Removing the Curse of Dimensionality," *Proc. 30th ACM Symp. On Computational Theory*, 1998, pp. 604-613.

Indyk, "Stable Distributions, Pseudorandom Generators, Embeddings, and Data Stream Computation," *Proc. 41st IEEE Symposium on Foundations of Computer Science (FOCS)*, pp. 189-197, 2000.

Information Access Technologies, Inc., Aaddzz brochure, "The best Way to Buy and Sell Web Advertising Space," 1997.

Information Access Technologies, Inc., Aaddzz.com website archive from www.Archive.org, archived on Jan. 30, 1998.

Jeh and Widom, "SimRank: A Measure of Structural-Context Similarity," *Proc 8th ACM SIGKDD international conference on knowledge discovery and data mining*, Jul. 2002, pp. 538-543.

Jing et al., "Canonical image selection from the web," *Proc. 6th International Conference on Image and Video Retrieval (CIVR)*, pp. 280-287, 2007.

Jing and Baluja, "VisualRank: Applying PageRank to Large-Scale Image Search," *IEEE Transaction on Pattern Analysis and Machine Intelligence*, 2008, 30(11):1877-1890.

Joachims, "Text Categorization with Support Vector Machines: Learning with Many Relevant Features," *Proc 10th European Conf on Machine Learning*, 1998, pp. 137-142.

Joshi et al., "The story picturing engine—a system for automatic text illustration," *ACM Transactions on Multimedia, Computing, Communications and Applications*, 2006, 2(1):68-89.

Kautz et al., "ReferralWeb: Combining Social Networks and Collaborative Filtering," *Communications of the ACM*, 1997, 40(3):1-4.

Ke et al., "Efficient near-duplicate detection and sub-image retrieval," *Proc. ACM International Conference on Multimedia (ACM MM)*, pp. 869-876, 2004.

Ke and Sukthankar, "PCA-SIFT: A More Distinctive Representation for Local Image Descriptors," *Proc. Conference on Computer Vision and Pattern Recognition (DVPR)*, 2004, 2:506-516.

Kleinberg et al., "The Web as a graph: measurements, models, and methods," *Proc International Conference on Combinatronics*, 1999, 18 pages.

Kleinberg, "Authoritative Sources in a Hyperlinked Environment," *Journal of the ACM*, 1999, 46(5):604-632.

Kondor and Lafferty, "Diffusion kernels on graphs and other discrete structures," *Proc. 19th International Conference on Machine Learning (ICML)*, pp. 315-322, 2002.

Konstan et al., "GroupLens: Applying Collaborative Filtering to Usenet News," *Communications of the ACM*, Mar. 1997, 40(3):77-87.

Lazebnik et al., "A sparse texture representation using affine-invariant regions," *Proc. Conference on Computer Vision and Pattern Recognition (CVPR)*, vol. 2, pp. 319-324, 2003.

Leigh et al., "Transformation, Ranking, and Clustering for Face Recognition Algorithm Comparison," at http://www.itl.nist.gov/div898/itperf/renorm.pdf.

Liew et al., "Social Networks," Provisional U.S. Appl. No. 60/552,718, filed Mar. 15, 2004, 9 pages.

Liu et al., "A Comparative Study on Feature selection and Classification methods Using Gene Expression Profiles and Proteomic Patterns," *Genome Informatics* 13:, pp. 51-60, 2002.

Liu et al., "An Investigation of Practical Approximate Nearest Neighbor Algorithms," *Proc Neural Information Processing Systems*, 2004 at http://www.cs.cmu.edu/~tingliu/research.htm.

Lowe, "Distinctive Image Features from Scale-Invariant Keypoints," *International Journal of Computer Vision (IJCV)*, 2004, 60(2):91-110.

Lowe, "Local Feature View Clustering for 3D Object Recognition," *CVPR 2001*, at http://www.cs.ubc.ca/~lowe/papers/cvpr01.pdf.

Ma and Manjunath, "NeTra: A Toolbox for Navigating Large Image Databases," *Multimedia System*, 1999, 3(7):184-198.

Microsoft Corporation, "Is Friendster the 'Next Big Thing'?" at http://mobilemomentum.msn.com/article.aspx?aid=4, as available via the Internet and printed on Jul. 29, 2004.

Mikolajczyk and Schmid, "A performance evaluation of local descriptors," *IEEE Transactions on Pattern Analysis and Machine Intelligence (TPAMI)*, 2005, 27(10):1615-1630.

Monay and Gatica-Perez, "On Image Auto-Annotation with Latent Space Models," *MM'03*, Nov. 2-8, 2003.

Multiply, "About Multiply," at http://multiply.com/info/about, as available via the Internet and printed on May 3, 2004.

Multiply, "Help," at http://multiply.com/info/help, as available via the Internet and printed on May 3, 2004.

Multiply, "Multiply Privacy Policy," at http://multiply.com/info/privacy, as available via the Internet and printed on May 3, 2004.

Multiply, "Multiply Terms of Service," at http://multiply.com/info/tos, as available via the Internet and printed on May 3, 2004.

Nistér and Stewénius, "Scalable recognition with a vocabulary tree," *Proc. Conference on Computer vision and Pattern Recognition (CVPR)*, vol. 2, pp. 2161-2168, 2006.

Nowak and Jurie, "Learning visual similarity measures for comparing never seen objects," *Proc. Conference on Computer Vision and Pattern Recognition (CVPR)*, 2007.

Park et al., "Majority based ranking approach in web image retrieval," *Lecture Notes in Computer Science*, vol. 27-28, pp. 499-504, 2003.

Pentland et al., "Photobook: Content-based manipulation of image databases," *International Journal of Computer Vision (IJCV)*, 1996, 18(3):233-254.

Philbin et al., "Object retrieval with large vocabularies and fast spatial matching," *Proc. Conference on Computer Vision and Pattern Recognition (CVPR)*, 2007.

Pilászy, "Text Categorization and Support Vector Machines," *Computer Science*, 1998, vol. 1398, 10 pages.

Roach et al., "Video Genre Classification Using Dynamics," 2001, *Proc Acoustics, Speech, and Signal Processing on IEEE Intl Conference*, pp. 1557-1560.

Rothganger et al., "3D Object Modeling and Recognition Using Affine-Invariant Patches and Multi-View Spatial Constraints," *CVPR 2003*, at http://vasc.ri.cmu.edu/~hebert/04AP/fred_cvpr03.pdf.

Rowley et al., "Neural Network-Based Face Detection," *IEEE Transactions on Pattern Analysis and Machine Intelligence*, 1998, 20(1).

Schindler et al., "City-Scale Location Recognition," *Proc. Conference on Computer Vision and Pattern Recognition (CVPR)*, 2007, 7 pages.

Sebastiani, "Machine Learning in Automated Text Categorization," *ACM Computing Surveys*, 2002, 34(1):1-47.

Simon et al., "Scene summarization for online image collections," *Proc. 12th International Conference on Computer Vision (ICCV)*, 2007.

Smeulders et al., "Content based image retrieval at the end of the early years," *IEEE Transactions on Pattern Analysis and Machine Intelligence (TPAMI)*, 2000, 22(12):1349-1380.

Sullivan, Danny, "Is It Really Personalized Search?" http://searchenginewatch.com printed on May 13, 2004.

Szummer and Jaakkola, "Partially labeled classification with Markov random walks," *NIPS 2001*.

Tribe.net, "Listings Directory," at http://www.tribe.net/tribe/servlet/template/pub.Listings.vm, as available via the Internet and printed on Jun. 28, 2004.

Uchihashi and Kanade, "Content-free image retrieval by combinations of keywords and user feedbacks," *Proc. 5th International Conference on Image and Video Retrieval (CIVR)*, pp. 650-659, 2005.

Viola and Jones, "Robust Real Time Face Detection," *Int J Computer Vision*, 2004 at http://scholar.google.com/scholar?hl=en&lr=&cluster=10098362814192689387.

Wang et al., "AnnoSearch: Image Auto-Annotation by Search," *CVPR 2006*.

Weinberger et al., "Distance metric learning for large margin nearest neighbor classification," *Proc. 18th Conference on Advances in Neural Information Processing Systems (NIPS)*, vol. 18, pp. 1437-1480, 2006.

Winder and Brown, "Learning local image descriptors," *Prof. Conference on Computer Vision and Pattern Recognition (CVPR)*, 2007.

Xing et al., "Distance metric learning, with applications to clustering with side-information," *Proc. 15th Conference on Advances in Neural Information Processing Systems (NIPS)*, 2002, 15:450-459.

Yang et al., "Mining Social Networks for Targeted Advertising," *Proceedings of the 39th Hawaii International Conference on System Sciences*, 2006.

Yang and Pedersen, "A Comparative Study on Feature Selection in Text Categorization Source," *Proc 14th Intl Conf Machine Learning*, 1997, pp. 412-420.

Zeff et al., *Advertising on the Internet*, 2nd ed., John Wiley & Sons, 1999.

Zhou and Schölkopf, "Learning from Labeled and Unlabeled Data Using Random Walks," *Lecture notes in computer science*, 2004, Springer, 8 pages.

Zhu et al., "Semi-Supervised Learning Using Gaussian Fields and Harmonic Functions," *Proc. 20th Intl Conf on Machine Learning*, 2003, 8 pages.

Zhu, "Semi-Supervised Learning with Graphs," 2005, Doctoral Thesis, Carnegie Mellon University, 174 pages.

International Search Report/Written Opinion in PCT/US2008/062263 mailed Jan. 1, 2008, 13 pages.

International Preliminary Report on Patentability in PCT/US2008/062263 mailed Nov. 12, 2009, 7 pages.

International Search Report/Written Opinion in PCT/US2008/62285 mailed Dec. 5, 2008, 12 pages.

International Preliminary Report on Patentability in PCT/US2008/62285 mailed Nov. 12, 2009, 8 pages.

* cited by examiner

RANKING OF IMAGES AND IMAGE LABELS

CROSS-REFERENCE TO RELATED APPLICATIONS

This application is a continuation application of and claims priority to U.S. application Ser. No. 12/164,808, filed on Jun. 30, 2008. The above noted application is hereby incorporated by reference in its entirety.

BACKGROUND

The subject matter of this specification relates generally to image annotation.

Image search engines have become a popular tool on the Internet. These search engines help users find images that match their criteria. Some of these search engines index images by keywords or labels. Such image search engines retrieve images by matching users' search queries against these keywords or labels.

The keywords or labels for indexing an image can be drawn from text surrounding the image in a web page or other text associated with the image (e.g., the filename of the image, metadata associated with the image), for example. The keywords or labels can provide some indication of the content of an image. For example, an image of a horse can be associated with the keyword "horse." In some cases, the keywords for an image that are extracted from the text may be uninformative or not useful. For example, words such as "cool" and "wow" generally are uninformative with regard to the content of an image. Poorly labeled images can degrade the quality of an image search result.

SUMMARY

In a first general aspect, a method is described. The method includes determining a score for an image of a plurality of images with respect to each of one or more terms, identifying one or more of the terms for each of which the score for the image with respect to the respective identified term satisfies a criterion, and associating the identified terms with the image. Determining the score for the image with respect to a respective term includes determining probabilities of navigating between images in the plurality of images and determining the score for the image with respect to the respective term based on the probabilities.

In a second general aspect, a system is described. The system includes a computer-readable medium, one or more processors, and instructions stored in the computer-readable medium and configured for execution by the one or more processors. The instructions include instructions to determine a score for an image of a plurality of images with respect to each of one or more terms, identify one or more of the terms for each of which the score for the image with respect to the respective identified term satisfies a criterion, and associate the identified terms with the image. The instructions to determine the score for the image with respect to a respective term comprises instructions to determine probabilities of navigating between images in the plurality of images and determine the score for the image with respect to the respective term based on the probabilities.

In a third general aspect, a system is described that includes means for determining a score for an image of a plurality of images with respect to each of one or more terms, means for identifying one or more of the terms for each of which the score for the image with respect to the respective identified term satisfies a criterion, and means for associating the identified terms with the image. The means for determining the score for the image with respect to a respective term includes means for determining probabilities of navigating between images in the plurality of images and means for determining the score for the image with respect to the respective term based on the probabilities.

In another general aspect, a method is described that includes identifying a set of images. One or more of the images are associated with a set of one or more terms. The method also includes determining probabilities of navigating between images in the set of images, ranking each term in the set of terms with respect to an image of the set of images based on the probabilities, and associating with the image a term of the set of terms that has a highest ranking with respect to the image.

In yet another general aspect, a method is described. The method includes identifying a set of images. At least a subset of the images is associated with a term. The method also includes determining probabilities of navigating between images in the set of images, ranking each of the set of images with respect to the term based on the probabilities, and selecting an image of the set of images that has a highest ranking with respect to the term.

Particular embodiments of the subject matter described in this specification can be implemented to realize one or more of the following advantages. The importance and relevance of terms with respect to an image can be determined. The most relevant term for an image can be identified. Terms whose relevance level with respect to an image is above a threshold is associated with the image.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
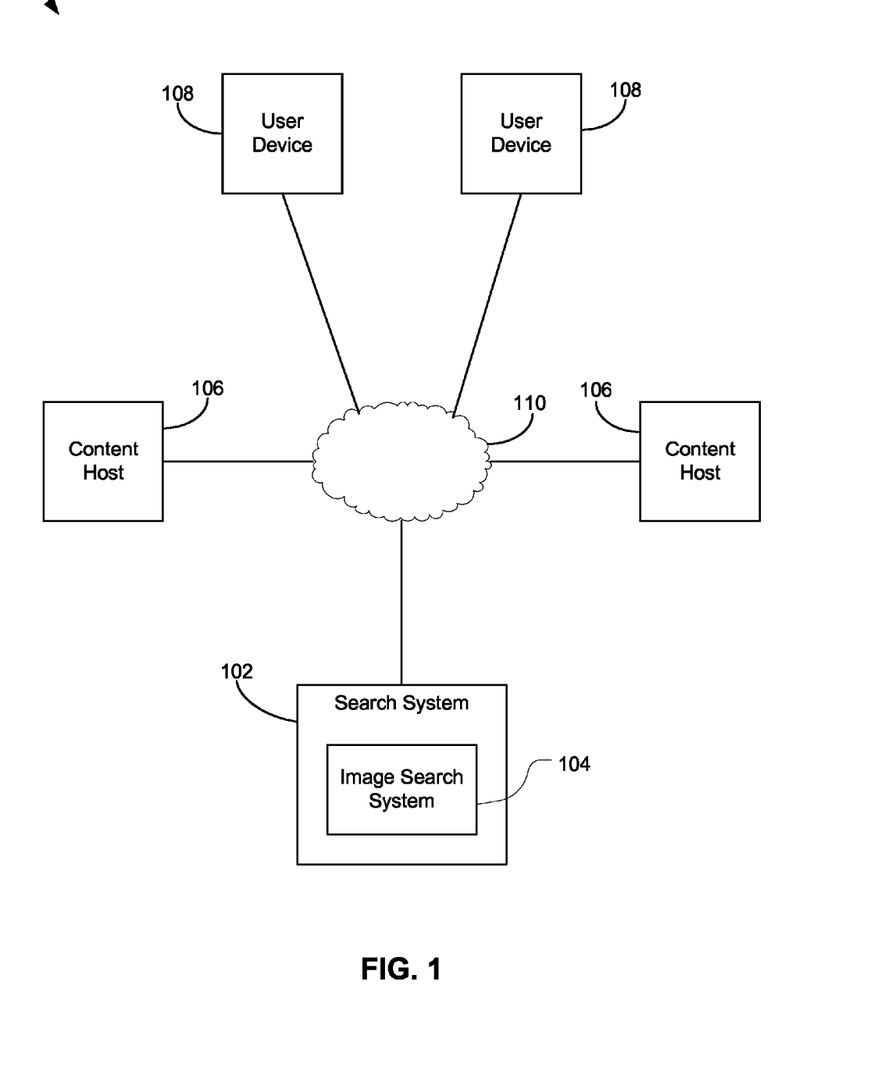
FIG. 1 is a block diagram illustrating an example image search environment.

FIG. 1 illustrates an image search environment 100. The environment 100 includes a search system 102, one or more content hosts 106, and one or more user devices 108. These components can communicate over one or more networks 110. The one or more networks 110 can include local area networks, wide area networks, wireless networks (e.g., Wi-Fi networks), mobile phone networks, and the Internet.

Content hosts 106 host content. The hosted content can include text, images, audio, video, and so forth. In some implementations, a content host 106 hosts one or more images. An image hosted by the content host 106 can be downloaded by or pushed to a user device 108. The image may be downloaded or pushed in a web page written in the Hypertext Markup Language (HTML) or any other suitable language for authoring web pages. In some implementations, content host 106 is a web server that hosts web pages and images.

The environment 100 includes one or more user devices 108. The user device 108 can include a desktop computer, laptop computer, a media player (e.g., an MP3 player, a streaming audio player, a streaming video player, a television, a computer, a mobile device, etc.), a mobile phone, or other device that can access content via network 110.

A content host 106 can allow a user device 108 to access images hosted by the content host 106. In some implementations, a user at a user device 108 can access images at a content host 106 through a web browser application, for example.

A search system 102 indexes content (e.g., web pages, images, etc.) hosted by content hosts 106. The search system 102 also receives search queries for content and returns search results, drawn from the indexed content, in response to the received queries.

The search system 102 includes an image search system 104. An image search system 104 indexes images, receives search queries for the images, and returns results in response to the queries. In some implementations, a crawler associated with the image search system 104 crawls the content hosts 106 for images and indexes the crawled images. In some implementations, the image search system 104 stores copies of the crawled images.

The image search system 104 can receive search queries for images from user devices 108. An image search query can include one or more terms. A term can include one or more words, phrases, numbers, characters, and so forth. In some implementations, a user at a user device 108 accesses a user interface of the image search system 104 and enters a search query through, for example, a browser application at the user device 108. For an image search query, the image search system 104 finds the indexed images that satisfy the query, and return the search results to a user device 108 for presentation to the user. The search results for an image search can include thumbnails of the images that satisfy the query and hyperlinks to the images or web pages that include the images. In some other implementations, a user at a user device 108 accesses a user interface of the search system 102 and enters a query for images. The search system 102 finds the images that satisfy the query using the image search system 104. The search system 102 returns the search results to the user device 108 for presentation to the user.

The image search system 104 can associate terms with images and index the images based on the associated terms. A term can include one or more words, phrases, numbers, characters, and so forth. In some implementations, an image satisfies an image search query if the query matches the terms associated with the image and optionally other criteria. A term associated with an image can also be referred to as a "label" or a "keyword."

In some implementations, the image search system 104 associates terms with an image that are derived from metadata of the image. For example, the metadata of a JPEG image file can include terms that indicate a title, a description, categories, keywords, and the like. In some implementations, the image metadata is data embedded in an image file in accordance with the Exchangeable Image File Format (EXIF) specification. The image search system 104 can read the metadata of the image, as well as the filename of the image, and extract terms from the metadata or the filename.

In some implementations, the terms that are associated with an image can be determined by the image search system 104. The image search system 104 can extract one or more terms associated with content related to the image and associate the terms with the image. For example, the image search system 104 can extract terms from text from a web page in which the image appears, anchor text of links to the image, text from a web page to which the image links (if the image is an anchor for a hyperlink to the web page), and so on.

In some implementations, the image search system 104 can determine terms to be associated with an image based on user testing. For example, the image search system 104 can show a population of users an image and ask the users to specify terms that come to mind when they see the image and optionally order them. The terms entered by the users provide an indication of what users believe the subject matter, topics, or concepts of the image are. The image search system 104 can select the most popular of the user-specified terms to associate with the image.

Figure 2:
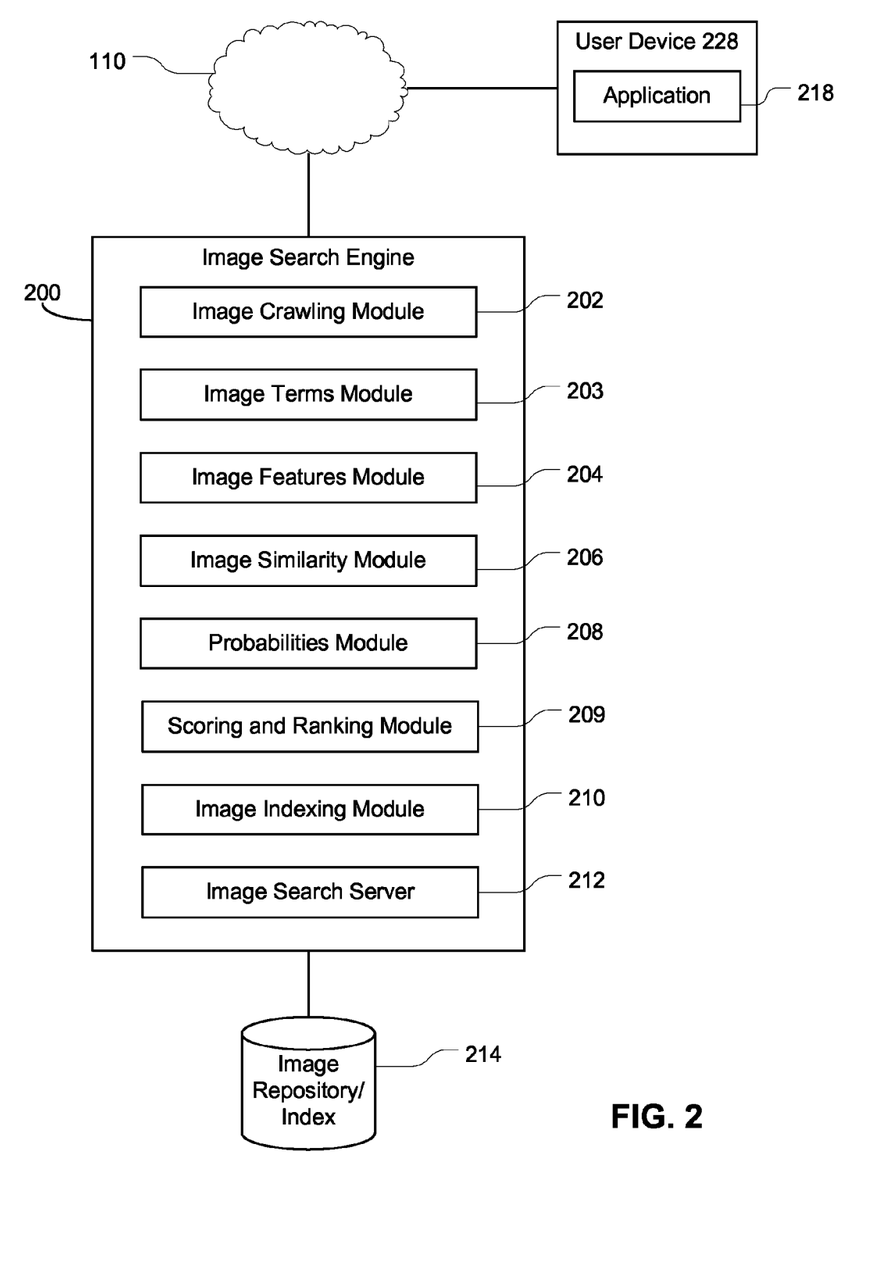
FIG. 2 is a block diagram illustrating an example system architecture for an image search engine.

FIG. 2 is a block diagram illustrating an example system architecture for an image search engine 200. The image search engine 200 includes an image crawling module 202, an image terms module 203, an image features module 204, an image similarity module 206, a probabilities module 208, a scoring and ranking module 209, an image indexing module 210, an image search server 212, and an image repository/index 214. In some implementations, the image search engine 200 is an implementation of image search system 104.

The image crawling module 202 crawls content hosts 106 for images. The image crawling module 202 accesses content at the content hosts 106, such as images and any other content associated with the images. The crawling module 202 receives copies of the crawled images (e.g., by downloading) and other content for further processing by the image search engine 200.

The image terms module 203 determines what terms are associated with an image. The image terms module 203 extracts terms from metadata associated with an image (e.g., filename, EXIF metadata, and so on). The image terms module 203 can also determine the terms that may be associated with an image from other content associated with the image (e.g., a text of a web page in which the image is associated, anchor text of hyperlinks to the image, or text of a web page to which the image links).

The image features module 204 identifies features of the images. The image features module 204 can determine, for an image, one or more features. The image similarity module 206 determines a degree of similarity for pairs of images. The image similarity module 206 compares, for any pair of images within a repository or set of images, the features of the images in the pair, as identified by the image features module 204, and determines a value representing a degree of similarity between the two images in the pair. Further details regarding the identification of features and the determination of the degree of similarity are described below.

The probabilities module 208 determines estimated transitional probabilities for pairs of images. A transitional probability between images is a probability that a user will select an image given another image under particular conditions. Further details regarding transitional probabilities are described below.

Image indexing module 210 indexes images according to the terms associated with an image. The indexing enables searching of the images based on the terms, and in particular, using queries that contain terms.

The image search server 212 processes search queries for images and returns search results in response to the queries. A search query for images can include one or more terms. The image search module 212 receives a query (from a user device 108, for example), finds images (e.g., images from content hosts 106 and indexed in image repository/index 214) that satisfy the search query, and returns the search results. In some implementations, the search results are returned in a web page that shows thumbnails of the images that satisfy the query and information related to the images (e.g., image file size and file type, image dimensions, or domain or content host at which the image is located).

Information regarding the images crawled by the image crawling module 202, and optionally copies of the crawled images, can be stored in an image repository/index 214. In some implementations, the image repository 214 is a database (e.g., a MySQL® database) of images and image information. The image repository/index 214 also stores an index of images that have been crawled or received by the image search engine 200. The images are indexed by the terms associated with the images. A copy of an image does not have to be stored in the image repository/index 214 to be in the index.

The image search engine 200 can communicate with a user device 228 over one or more networks 110. In some implementations, the user device 228 is an implementation of user device 108. The user device 108 can include an application 218. In some implementations, the application 218 is a web browser. A user using the user device 108 can access a user interface of the image search engine 200 through the application 218.

As described above, image search engine 200 uses terms to index images. Thus, the relevance of a term to a document affects the quality of the search results returned by the image search engine 200. Rankings can be calculated for terms associated with images according to an image term ranking function.

In some implementations, the image term ranking function TRA(I, Q) is a probability distribution that represents a likelihood that a user selects (e.g., clicks on) a particular image I given a query Q (which includes one or more terms) and an image repository D, under the following scenario:
1) the user randomly selects one image associated with query Q (image "A") from image repository D;
2) given image A, the user can request additional images similar to image A, and the user is given the top N image results based on similarity between image A and the remainder of the images in D;
3) the user will select an image from those top N results (image "B") with transitional probability P(A–>B); and
4) set A=B, and repeat 2) thru 4) for N total iterations, where N is a relatively small number.

In some other implementations, the image term ranking function TRB(I, Q) is a probability distribution that represents a likelihood that a user selects (e.g., clicks on) a particular image I given a query Q (which includes one or more terms) and an image repository D, under the following scenario:
1) the user randomly selects one image (image "A") from image repository D;
2) given image A, the user can request additional images similar image A, and the user is given the top N image results based on similarity between image A and the remainder of the images in D;
3) the user will select an image from those top N results (image "B") with transitional probability P(A–>B); however, the user has some probability of selecting an image that is associated with query Q; and
4) set A=B, and repeat 2) thru 4) for N total iterations, where N is a relatively small number.

Implementations of these image term ranking functions are described below.

Figure 3:
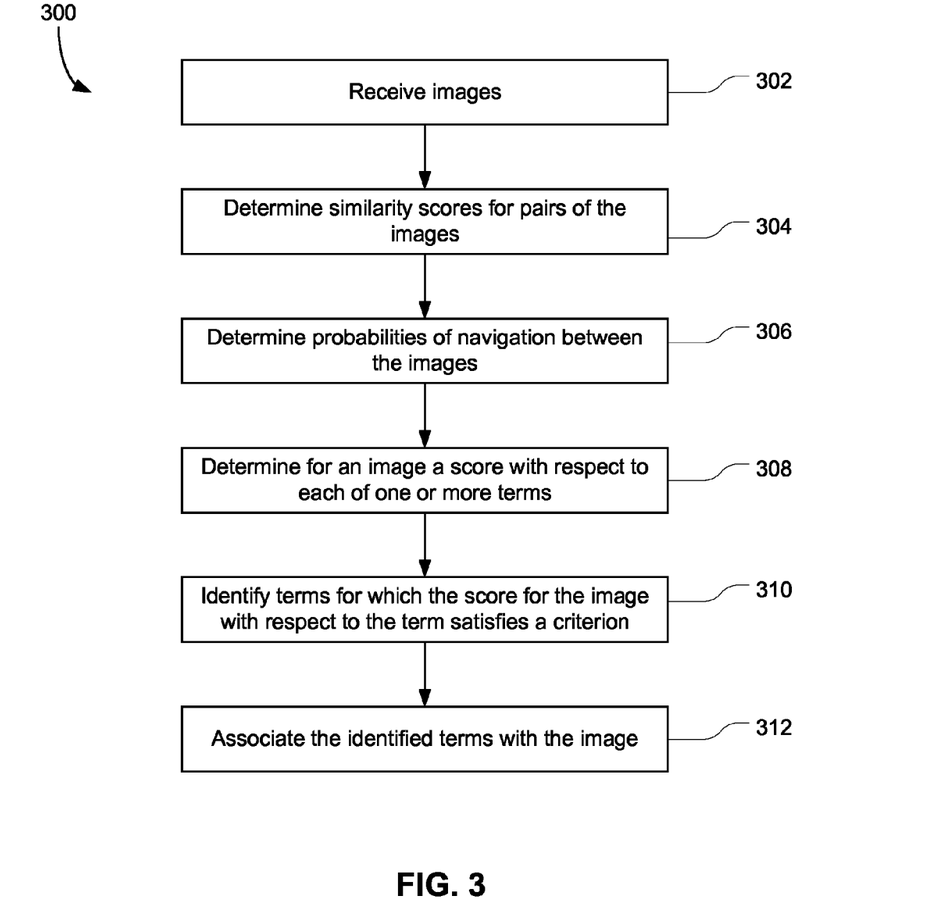
FIG. 3 is a flow diagram illustrating an example process for associating terms with an image.

FIG. 3 is a flow diagram illustrating an example process 300 for associating terms with an image. For convenience, the process 300 will be described with reference to a system (e.g., image search engine 200) that performs the process.

Multiple images are received (302). In some implementations, the images can be received as part of a crawl, by image crawling module 202, for example, of content hosts hosting the images. In some implementations, the images can also or alternatively be received from an upload of images to the system. In some implementations, content associated with the images (e.g., web pages in which the images are located) is also received. These received images are indexed by the image indexing module 210.

A received image can be associated with one or more terms. For example, the image search engine can read the metadata of the image for an image and extract any title, description, category, keyword, or other terms from the metadata and associate the terms with the image. As another example, terms that can be associated with the image can be determined from other content associated with the image (e.g., web page in which the image is located or anchor text of hyperlink to the image). Any number of the images can be associated with a particular term, and an image can be associated with multiple terms.

In some implementations, the terms are extracted from the metadata or other content associated with the image, without any discrimination as to whether a term is useful. In some other implementations, a metric can be determined for terms, and terms with values for the metric that are above a threshold or satisfy some criterion are selected and associated with the image. In some implementations, the metric is the term frequency—inverse document frequency (TFIDF) of the term. For example, say that an image is included in a web page that includes terms X and Y. If term X has a TFIDF with respect to the web page that is above a predefined threshold and the TFIDF for term Y is not above the threshold, then term X, and not term Y, is associated with the image. Using the TFIDF as a metric can be useful for removing relatively uninformative terms (e.g., "a," "the," prepositions, etc.) from consideration.

Similarity scores are determined for pairs of images (304). For example, an image can be paired with one or more of the remaining images, and for each pair, image similarity module can determine a degree of similarity between the image pair. Further details regarding the determination of a degree of similarity between a pair of images are described below in reference to FIG. 4.

Probabilities of navigation between the images are determined (306). For any two images A and B, probabilities module 208 can determine a transitional probability P(A–>B) (i.e., the transitional probability as described in relation to the image term ranking functions TRA or TRB described above). In some implementations, P(A–>B) is approximated using the similarity between images A and B and exploiting the insights that: (1) the user is likely to navigate to an image that is more similar to A than to an image that is less similar to image A, and (2) the user is likely to ignore images that are too similar to image A. In some implementations, the transitional probability is estimated by defining a beta distribution over the image similarity. An example beta distribution is illustrated in graph 500 in FIG. 5. In graph 500, the x-axis is the image similarity ([0,1]) between two images and the y-axis is the corresponding transitional probability. In the beta distribution illustrated in graph 500, the transitional probability increases monotonically as the image similarity increases, up to a certain point. After the image similarity has reached a certain point, the transitional probability decreases monotonically. In other words, the transitional probability decreases when the two images are too similar to each other.

Figure 5:
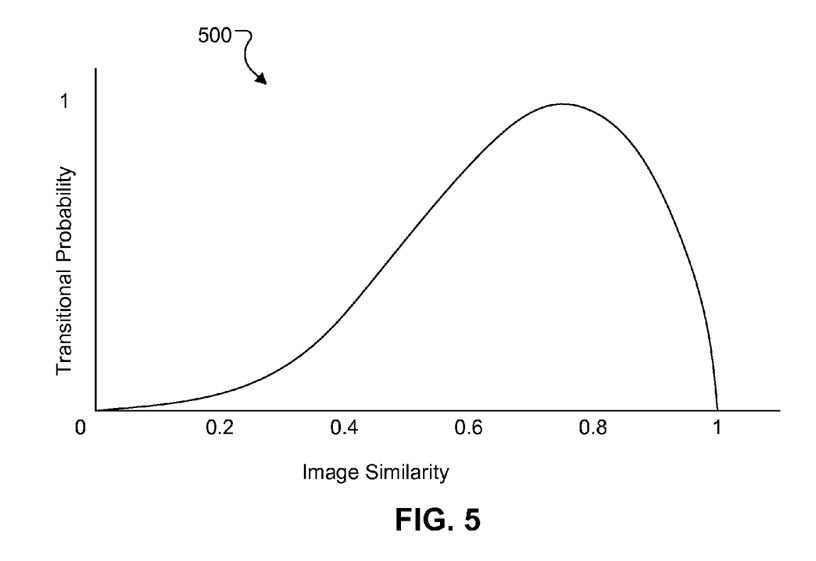
FIG. 5 is an example transitional probability distribution graph.

Other functions or distributions for expressing the transitional probability as a function of image similarity can also be used. For example, the function can be linear. The function can also be specified explicitly by the user (diversity, etc), or estimated and learned from how user interacts with the images from usage data. The function can be estimated/learned for each user, or for a collection of users (those fit into one demographic group).

In some implementations, the determination of the transitional probability can be augmented by including one or more additional factors. In some implementations, a metric of the quality of image B is included. For example, image quality can be measured using one or more query-independent indicia of image quality (e.g., color depth of the image, how much of the image is in focus, level of saturation in the image, and so on). In some implementations, the image quality metric is a score between 0 and 1, inclusive, that is a function of the one or more indicia of image quality.

In some implementations, another additional factor is a similarity of images A and B based on a relationship between pages or locations from which images A and B were crawled (e.g., pages or locations where images A and B are hosted). For example, images crawled from related web pages (e.g., same blog, same website, pages in the same social network) can be considered to be more similar than images from unrelated web pages. An example of a relationship-based similarity is a structural-context similarity, which is disclosed in Jeh et al., "SimRank: A Measure of Structural-Context Similarity," Proceedings of the 8th ACM SIGKDD International Conference on Knowledge Discovery and Data Mining, July 2002, pages 538-543. A score for the relationship-based similarity (e.g., a structural-context similarity score) can be calculated and used as an additional factor in the approximation of the transitional probability. Click data can also be used to enhance the transitional probability estimate. For example, "co-click data" may measure the likelihood that an image is viewed before or after another image. Given a sufficient amount of co-click data, then transitional probability can be computed from it. Given limited co-click data, then it can be used to refine an estimation of image transition from similarity measurements.

It should be appreciated that the additional factors described above are examples. Other additional factors can be used.

As described above, the additional factors can be used, along with the image similarity, to approximate, estimate, or otherwise determine the transitional probability. In some implementations, the probability P(A–>B) is a function of a product of the image similarity and the additional factors. For example, P(A–>B) can be proportional to the product of the image similarity score between images X and Y, the image quality score of image Y, and the relationship-based similarity score between images X and Y. In some other implementations, the probability P(X–>Y) is a function of a linear combination of the image similarity and the additional factors. For example, P(X>Y) can be proportional to a linear combination of the image similarity score between images X and Y, the image quality score of image Y, and the relationship-based similarity score between images X and Y.

More generally, any suitable function can be used to derive a transitional probability value from an image similarity metric and any number of additional factors.

In some implementations, for a pair of images whose similarity is below a predetermined threshold, the transitional probability is 0.

For each image in the multiple images, scores with respect to each of one or more terms are determined (308). The scoring and ranking module 209, for example, can determine a score under image term ranking function TRA or TRB for an image with respect to each of one or more terms. The output is one or more scores for an image, where each score is with respect to a respective term. Thus, for example, for an image I, the output is a score for 1 with respect to a term M, a score for 1 with respect to a term N, and so on. The algorithms for determining the scores are described in further detail below.

Terms for which the score for the image with respect to the term satisfies a criterion are identified (310). The scoring and ranking module 209 can identify terms for which the score for an image with respect to the term satisfies one or more particular criteria. The particular criteria depend on the particular objective. For example, if the objective is to identify a single "best" term for an image, then a criterion can be that the score for the image with respect to the term is the highest among the scores for the image with respect to each of one or more terms. As another example, if the objective is to identify one or more "good" terms for the image, then a criterion can be that the score for the image with respect to the term is greater than a predetermined threshold and/or that the score be in the top N among the scores for the image with respect to each of one or more terms, where N is a natural number greater than 0.

The image search engine 200 associates the identified terms with the image (312). For example, the image indexing module 210 can add the identified terms as keywords for the image in the index 214. When a user enters a query that includes the identified terms, the image can be included as a search result.

Process 300 determines scores for an image with respect to each of one or more terms and identifies terms for which the scores for the image with respect to the terms satisfy a criterion. In some implementations, the reverse, i.e., determining scores for one or more images with respect to a term and identifying images whose scores with respect to a term satisfy a criterion, can be performed. In these implementations, the objective can be the identification of a "most relevant" image or "relatively more relevant" images for a term among one or more images; the criteria for identifying images can be the image with the highest score with respect to the term or images whose scores with respect to the term are above a predetermined threshold and/or are in the top N, respectively. Further details regarding determining scores for one or more images with respect to a term are described below.

Figure 4:
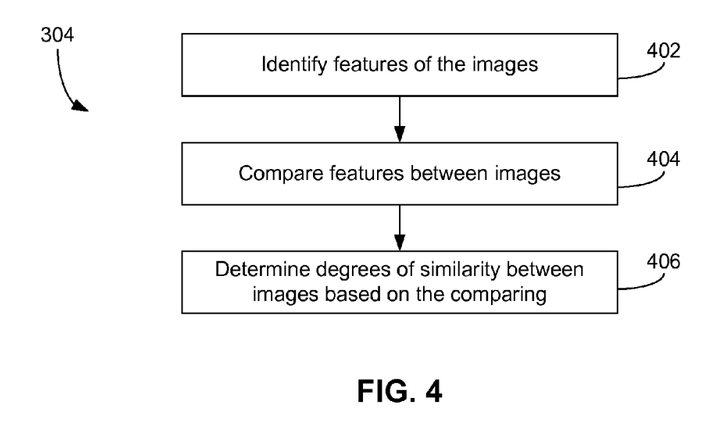
FIG. 4 is a flow diagram illustrating an example process for determining image similarities.

FIG. 4 illustrates the determination of a degree of similarity between a pair of images (in reference to block 304, FIG. 3) in further detail. For convenience, FIG. 4 will be described with respect to a pair of images "Image A" and "Image B." However, the described process can be performed on any pairing of images, and thus degrees of similarities can be determined for any number of pairs of images in the received set of images.

One or more global and/or local features of Image A and one or more global and/or local features of Image B are identified (402). Examples of image features that may be used include image features based on, for example, intensity, color, edges, texture, or other aspects of the image. Features can be extracted using wavelet transforms or other convenient techniques. For example, regarding intensity, each image may be divided into small patches (e.g., rectangles, circles or polygons) and an intensity histogram computed for each patch. Each intensity histogram may be used as a feature for the image. Similarly, as an example of a color-based feature, a color histogram may be computed for each patch (or for different patches) within each image. A color histogram can be similarly computed to obtain a color-based histogram. The color histogram may be calculated using any color space, e.g., the RGB (red, green, blue) color space, YIQ (luma and chrominance), or another color space.

Histograms can also be used to represent edge and texture information. For example, histograms can be computed based on patches of edge information or texture information in an image. For wavelet based techniques, a wavelet transform may be computed for each patch and used as an image feature.

The features discussed above represent an exemplary list of possible image features that may be used for determining similarities between images. Other image features may be used. In some implementations, the features are identified using the known scale-invariant feature transform (SIFT). An examples of the SIFT technique is described in Lowe, "Distinctive Image Features from Scale-Invariant Keypoints," *International Journal of Computer Vision*, Vol. 60, Issue 2 (2004), pp. 91-110.

In some implementations, a global feature is a feature that is identified for the image as a whole. For example, a color or intensity histogram of the entire image is a global feature. A local feature is a feature that is identified for a portion of the image. For example, a color or intensity histogram of a patch in the image is a local feature.

In some implementations, to improve computation efficiency, features may be computed only for certain areas within images. For example, "objects of interest" within an image may be determined and image features may only be computed for the objects of interest. For example, if the image feature being used is a color histogram, a histogram may be computed for each patch in the image that includes an object of interest. Objects of interest within an image can be determined in a number of ways. For example, for color, objects of interest may be defined as points where there is high variation in color (i.e., areas where color changes significantly). Objects of interest can be determined mathematically in a variety of ways and can be based on determining discontinuities or differences from surrounding points. In some implementations, the objects of interest are determined based on points of interest (or "keypoints") identified in the image. The SIFT technique is an example of one technique for locating keypoints and objects of interest and features for these keypoints. In some implementations, the computed image features are features that are local to the keypoints or objects of interest.

In some implementations, a feature identified for a keypoint includes a position (e.g., X-Y coordinates of the image, orientation, and scale (e.g., radius of a patch centered on the keypoint). When these image features are compared for a pair of images, as described below, the orientations and scales of the features can be compared as a geometrical verification between the two images in the pair.

As an example of the use of keypoints, say that Image A is an image of the Eiffel Tower, where the Eiffel Tower takes up a large portion of the image, and that Image B is an image of a tourist with the Eiffel Tower in the background, where the Eiffel Tower takes up a small portion of the image. Using keypoint identification, points on the Eiffel Tower in Image A and on the Eiffel Tower in Image B can be identified as keypoints. The comparison of these features may indicate that Image B contains an object (Eiffel Tower) that is in Image A, and vice versa.

Additionally, in some implementations, the various features described above may be computed using different image scales. For example, an image can be examined and features computed in its original scale and then features may be successively examined at smaller scales. Additionally or alternatively, features may be selected as features that are scale invariant or invariant to affine transformations. The SIFT techniques, for example, can be used to extract distinctive invariant objects from images. The extracted objects are invariant to image scale and rotation.

The identified features are compared; the features of Image A are compared to the corresponding features of Image B (404). A degree of similarity (or a "similarity score") between Image A and Image B is determined based on the comparison (406). For each feature that is to be used, a comparison function may be selected. A number of different comparison functions may be used to compare images. The particular comparison function to use may be decided offline or in non-realtime operation. The output of the comparison function can be used to determine the similarity. For example, the similarity can be a linear combination of the outputs of the comparison functions.

In general, a comparison function may operate to generate a value defining a similarity measure between a particular feature in one image and the corresponding feature in another image. As an example of a possible comparison function, consider a simple histogram comparison function, which is described in pseudo-code in Table I, below. As shown in Table I, the histogram comparison function returns a value that is the sum of the absolute values of the differences between corresponding bins in the input histograms. Smaller values returned from this function indicate greater similarity between the input histograms.

TABLE I

Compare_histogram_type_features(histogram1,histogram2)
   Difference = 0;
   For all bins, b, in histogram:
      Difference = Difference + |histogram1[b] − histogram2[b]|
   Return(Difference)

The histogram comparison function of Table I is exemplary, and other comparison functions can be used to compare histograms. For example, squared differences may be used rather than absolute differences, bin correlations may be taken into account instead of absolute differences, or percent differences may be used instead of absolute differences. Additionally, for image features other than those based on histograms, different comparison functions may be used.

The selection of the image features to use and the comparison functions to use may be performed offline or in non-realtime operation. For example, image features module 204 and image similarity module 206 can be initially configured to use one or more image features and one or more comparison functions. After these initial acts, image features module 204 and image similarity module 206 may function in a realtime mode to determine pairwise degrees of similarity for a set of input images, such as images received from a crawl by image crawling module 202.

In some implementations, the similarity between Image A and Image B is a linear combination of scores from comparisons between corresponding features of Image A and Image B. An example algorithm for calculating the image similarity is shown in pseudo-code in Table II, below.

TABLE II

```
image_similarity_score = 0
For each feature F_A of image A:
    For each feature F_B of image B that is of type F_A (where B is not A)
        feature_similarity_score = compare_features(F_A, F_B)
        image_similarity_score = image_similarity_score +
    feature_similarity_score
```

In the algorithm shown in Table II, each feature $F_A$ of Image A is compared with every feature $F_B$ of Image B that is the same feature type. In other words, if $F_A$ is a color histogram then the comparison is performed with the color histogram features of Image B, if $F_A$ is an edge histogram then the edge histogram features of Image B are compared, etc.

In the operation shown in Table II, each image feature is weighted equally. In some implementations, different features may be weighted differently. For example, color-based features may be less important than intensity or edge-based features. Accordingly, a features similarity score may be multiplied by a weight that reflects the importance of the particular feature.

In some other implementations, the degree of similarity between two images is calculated as the number of shared keypoints (i.e., keypoints whose feature(s) match) divided by the total number of keypoints.

The operation shown in Table II can be relatively computationally expensive if repeated for many images, as it requires $N^2$ comparisons for a set of N images, and for each comparison, $M_i*M_j$ feature comparisons, for $M_i$ and $M_j$ local features in each image. Techniques are known that may accelerate this type of operation. For example, one such technique is described in Grauman et al., "The Pyramid Match Kernel: Discriminative Classification with Sets of Image Features," Tenth IEEE International Conference on Computer Vision (October 2005), Vol. 2, pp. 1458-1465.

FIG. 4 was described with respect to a single pair of images, Image A and Image B. The process described can be repeated for any number of unique pairs of images amongst a set of multiple images, where each image in the set can be paired with each other image in the set. In some implementations, for a set of images, a degree of similarity can be determined for each unique pair of images among the set. In some other implementations, degrees of similarity can be calculated for a subset of all of the unique pairs of images in the set of images. In some implementations, the image pairs for which a degree of similarity is to be calculated can be a random sample of all of the unique pairs of images in the set; the degrees of similarity for the rest of the pairs can be approximated by other less computationally expensive metrics. Examples of such metrics include, for example, a shortest path between two nodes, in an image similarity graph, corresponding to a pair of images.

Score Determination

Process 300 above describes determining scores for an image with respect to a term. The method of calculating the score depends on the desired image term ranking function TRA or TRB.

In some implementations, for ranking function TRA, the method of calculating the score (labeled as "$TR_A$") is as follows. Given a set of images M with images $M_1$, $M_2$, $M_3$ ... $M_n$ and their pairwise transitional probabilities P, $TR_A(M_i, Q)$ for an image $M_i$ and term Q can be calculated recursively as described below.

First, for a collection of images M (which is a subset of all of the images known to the image search engine 200, which consists of the images stored and/or indexed in the image repository/index 214) that are associated with term Q, the $TR_A$ for each image in $M_i$ is initialized as follows:

$TR_A(M_i, Q)$=(number of times Q appears in the set of terms associated with $M_i$)/(number of times Q appears in image index 214)[if $M_i$ is associated with Q]; 0 [otherwise]     Equations I After the initialization of the $TR_A$ values, the following set of calculations are repeated until convergence:

$TR_A(M_1,Q)=P(M_1->M_1)*TR_A(M_1,Q)+P(M_2->M_1)$
$*TR_A(M_2,Q)+P(M_3->M_1)*TR_A(M_3,Q)++$
$P(M_n->M_1)*TR_A(M_n,Q)$ $TR_A(M_2,Q)=P(M_1->M_2)*TR_A(M_1,Q)+P(M_2->M_2)$
$*TR_A(M_2,Q)+P(M_3->M_2)*TR_A(M_3,Q)++$
$P(M_n->M_2)*TR_A(M_n,Q)$

...

$TR_A(M_n,Q)=P(M_1->M_n)*TR_A(M_1,Q)+P(M_2->M_n)$
$*TR_A(M_2,Q)+P(M_3->M_n)*TR_A(M_3,Q)++$
$P(M_n->M_n)*TR_A(M_n,Q)$     Equations II For each of the equations above, the sum of the transitional probabilities (e.g., $P(M_1->+P(M_2->M_1)+P(M_3->M_1)+ \ldots +P(M_n->M_1)$ in the equation for $TR_A(M_1, Q)$) is equal to 1.

In some other implementations, for TRB, the method of calculating the score (labeled as "$TR_B$") is as follows. Given a set of images M with images $M_1$, $M_2$, $M_3$ ... $M_n$ and their pairwise transitional probabilities P, $TR_B(M_i, Q)$ for an image $M_i$ and term Q can be calculated recursively as described below.

First, for a collection of images M (which is a subset of all of the images known to the image search engine 200, which consists of the images stored and/or indexed in the image repository/index 214) that are associated with term Q, the $TR_B$ for each image in M is initialized as follows: $TR_B(M_1, Q)=TR_B(M_2, Q)=TR_A(M_n, Q)=1/n$, where n is the number of images in M.

After the initialization of the $TR_B$ values, the following set of calculations are repeated until convergence:

$TR_B(M_1,Q)=[(1-d)/n*\Delta(M_1,Q)]+d*[P(M_1->M_1)*TR_B$
$(M_1,Q)+P(M_2->M_1)*TR_B(M_2,Q)+P(M_3->M_1)$
$*TR_B(M_3,Q)+ \ldots +P(M_n->M_1)*TR_B(M_n,Q)]$ $TR_B(M_2,Q)=[(1-d)/n*\Delta(M_2,Q)]+d*[P(M_1->M_2)*TR_B$
$(M_1,Q)+P(M_2->M_2)*TR_B(M_2,Q)+P(M_3->M_2)$
$*TR_B(M_3,Q)+ \ldots +P(M_n->M_2)*TR_B(M_n,Q)]$

...

$TR_B(M_n,Q)=[(1-d)/n*\Delta(M_n,Q)]+d*[P(M_1->M_n)*TR_B$
$(M_1,Q)+P(M_2->M_n)*TR_B(M_2,Q)+P(M_3->M_n)$
$*TR_B(M_3,Q)+P(M_n->M_n)*TR_B(M_n,Q)]$,     Equations III where $\Delta(M_i, Q)$ is 1 if term Q is associated with image $M_i$ and 0 otherwise. d is a predefined value. In some implementations, d is 0.85. In some implementations, a desirable number of iterations for Equations I and II above are based on experiment or on domain knowledge.

Figure 6:
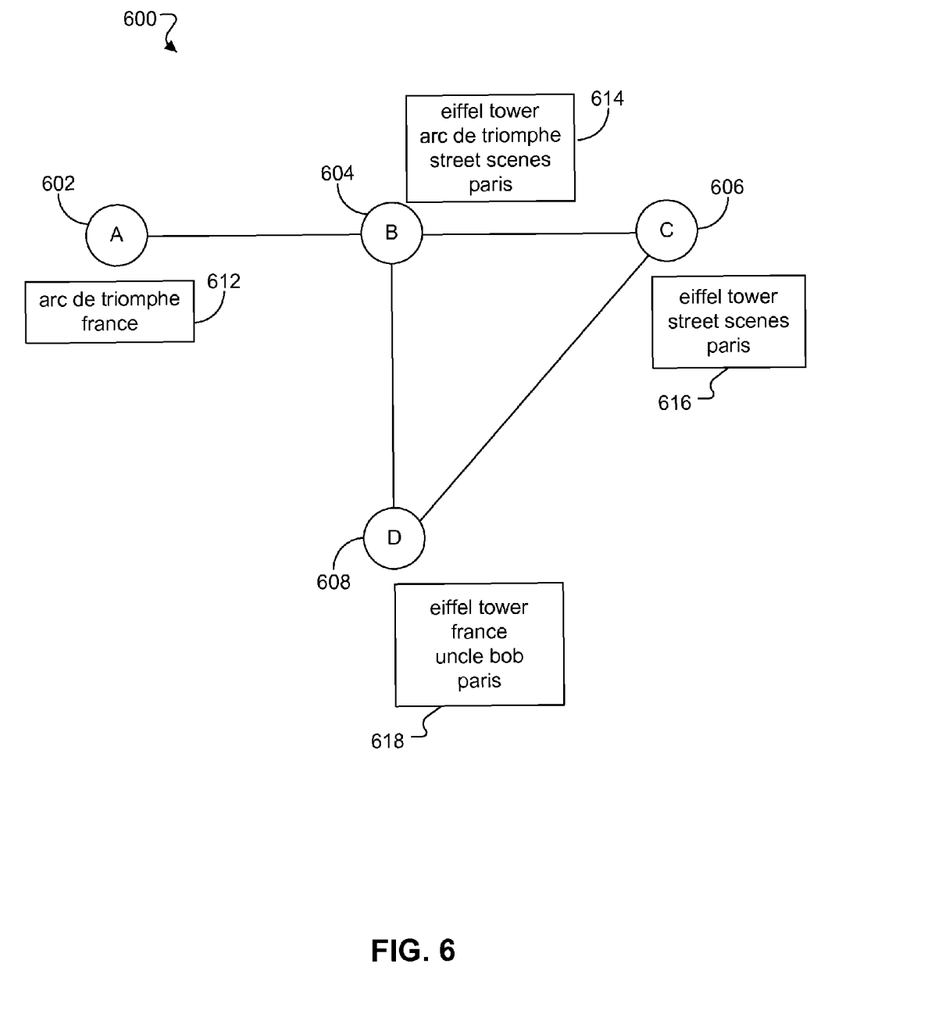
FIG. 6 is an example similarity graph of images.

Example calculations of $TR_A$ and $TR_B$ will now be illustrated using FIG. 6. FIG. 6 illustrates an example similarity graph 600 of images. The nodes 602, 604, 606, and 608 represent images A, B, C, and D, respectively. The edges between the nodes represent similarities between images that are above a predefined threshold, and corresponding non-zero transitional probabilities. For example, graph 600 includes no edge between nodes 602 and 608; their pairwise similarity is below the threshold and their transitional probability (A–>D or D–>A) is 0. Graph 600 also includes terms 612, 614, 616, and 618, that are associated with images A, B, C, and D, respectively.

For simplicity, the following transitional probabilities are used:

TABLE I

| Image | A | B | C | D |
|---|---|---|---|---|
| A | 0.25000 | 0.75000 | 0 | 0 |
| B | 0.25000 | 0.25000 | 0.25000 | 0.25000 |
| C | 0 | 0.25000 | 0.25000 | 0.50000 |
| D | 0 | 0.25000 | 0.50000 | 0.25000 |

Thus, for example, the transitional probability from A to B P(A–>B) is 0.75000, and the transitional probability from B to A P(B–>A) is 0.25000.

In Table I, each of the images has a non-zero (0.25) probability of transitioning to itself. Further, the sum of the transitional probabilities from an image is 1. Thus, for example, the sum of the transitional probabilities from A is 0.25000+0.75000+0+0=1, and the sum of the transitional probabilities from B is 0.25000+0.25000+0.25000+0.25000=1.

The calculation of $TR_A$ using the transitional probabilities of Table I will now be described. As an example, the calculation of TRA(I, "eiffel tower") for I=images A, B, C, and D will be illustrated. As described above, the first step in the calculation of $TR_A$ is the initialization of $TR_A$ using Equations I:

$TR_A$(A, "eiffel tower")=0 ("eiffel tower" is not associated with image A)

$TR_A$(B, "eiffel tower")=⅓ ("eiffel tower" appears once in the terms associated with image B and appears 3 times among the terms associated with images A, B, C, or D)

$TR_A$(C, "eiffel tower")=⅓ ("eiffel tower" appears once in the terms associated with image C and appears 3 times among the terms associated with images A, B, C, or D)

$TR_A$(D, "eiffel tower")=⅓ ("eiffel tower" appears once in the terms associated with image D and appears 3 times among the terms associated with images A, B, C, or D)

With the $TR_A$ values initialized, Equations II can be iterated using the initialized values and the transitional probabilities:

$TR_A(A,\text{"eiffel tower"})=0.25\times0+0.25\times0.333+0\times0.333+0\times0.333=0.08333$ $TR_A(B,\text{"eiffel tower"})=0.75\times0+0.25\times0.333+0.25\times0.333+0.25\times4.333=0.25000$ $TR_A(C,\text{"eiffel tower"})=0\times0+0.25\times0.333+0.25\times0.333+0.50\times0.333=0.33333$ $TR_A(D,\text{"eiffel tower"})=0\times0+0.25\times0.333+0.50\times0.333+0.25\times0.333=0.33333$    Iteration 1

$TR_A(A,\text{"eiffel tower"})=0.25\times0.08333+0.25\times0.25000+0\times0.333+0\times0.333=0.08333$ $TR_A(B,\text{"eiffel tower"})=0.75\times0.08333+0.25\times0.25000+0.25\times0.333+0.25\times0.333=0.29167$ $TR_A(C,\text{"eiffel tower"})=0\times0.08333+0.25\times0.25000+0.25\times0.333+0.50\times0.333=0.3125$ $TR_A(D,\text{"eiffel tower"})=0\times0.08333+0.25\times0.25000+0.50\times0.333+0.25\times0.333=0.3125$ . . .    Iteration 2

$TR_A(A,\text{"eiffel tower"})=0.09912$ $TR_A(B,\text{"eiffel tower"})=0.29915$ $TR_A(C,\text{"eiffel tower"})=0.30086$ $TR_A(D,\text{"eiffel tower"})=0.30086$    Iteration 6

The example above illustrates calculating the $TR_A$ values for the images with respect to a particular term. Equations I and II can also be used to calculate $TR_A$ values of an image with respect to each of multiple terms. For example, $TR_A$(A, Q) for Q="arc de triomphe," "France," "Paris," "eiffel tower," "street scenes," and "uncle bob" can be calculated to score and rank the terms with respect to image A.

The calculation of $TR_B$ using the transitional probabilities of Table I will now be described. As an example, the calculation of $TR_B$(I, "eiffel tower") for I=images A, B, C, and D will be illustrated. The first step in the calculation is the initialization of the $TR_B$ values. Thus, $TR_B$(A, "eiffel tower")=$TR_B$(B, "eiffel tower")=$TR_B$(C, "eiffel tower")=$TR_B$(D, "Eiffel tower")=0.25.

With the $TR_B$ values initialized, Equations III can be iterated using the initialized values and the transitional probabilities, with d=0.85:

$TR_B(A,\text{"eiffel tower"})=(0.15/4)\times0+(0.25\times0.25+0.25\times0.25+0\times0.25+0\times0.25)=0.10625$ $TR_B(B,\text{"eiffel tower"})=(0.15/4)\times1+(0.75\times0.25+0.25\times0.25+0.25\times0.25+0.25\times0.25)=0.35625$ $TR_B(C,\text{"eiffel tower"})=(0.15/4)\times1+(0\times0.25+0.25\times0.25+0.25\times0.25+0.5\times0.25)=0.25$ $TR_B(D,\text{"eiffel tower"})=(0.15/4)\times1+(0\times0.25+0.25\times0.25+0.5\times0.25+0.25\times0.25)=0.25$    Iteration 1

$TR_B(A,\text{"eiffel tower"})=(0.15/4)\times0+(0.25\times0.10625+0.25\times0.35625+0\times0.25+0\times0.25)=0.098281$ $TR_B(B,\text{"eiffel tower"})=(0.15/4)\times1+(0.75\times0.10625+0.25\times0.35625+0.25\times0.25+0.25\times0.25)=0.287188$ $TR_B(C,\text{"eiffel tower"})=(0.15/4)\times1+(0\times0.10625+0.25\times0.35625+0.25\times0.25+0.5\times0.25)=0.272578$ $TR_B(D,\text{"eiffel tower"})=(0.15/4)\times1+(0\times0.10625+0.25\times0.35625+0.5\times0.25+0.25\times0.25)=0.272578$ . . .    Iteration 2

$TR_B(A,\text{"eiffel tower"})=0.07000$ $TR_B(B,\text{"eiffel tower"})=0.25121$ $TR_B(C,\text{"eiffel tower"})=0.26154$ $TR_B(D,\text{"eiffel tower"})=0.26154$    Iteration 6

As shown for the Equation III above, in some implementations, the iterations converge to a stable distribution regardless of an initial starting point. The example above illustrates calculating the $TR_B$ values for the images with respect to a particular term. Equations III can also be used to calculate $TR_B$ values of an image with respect to each of multiple terms.

For example, $TR_B(A, Q)$ for Q="arc de triomphe," "France," "Paris," "eiffel tower," "street scenes," and "uncle bob" can be calculated to score and rank the terms with respect to image A.

An image can be associated with multiple terms, where some of the terms may be "noisy" terms that provide little or no information. Examples of "noisy" terms include "and," "www," and so on. The noisy terms also tend to be terms that appear very often in documents. In some implementations, the initial value of $TR_A$ for an image with respect to a term can be normalized to account for the degree of rarity of the term in documents by multiplying the initial TRA value by the inverse document frequency (i.e., number of documents in a corpus (e.g., web pages) that include the term divided by the total number of documents in the corpus). In some implementations, this can also be performed for $TR_B$ values.

In some implementations, the set of images for which, and based on which, the scores are calculated can be limited in scope. For example, the set of images can be limited to indexed images from a particular web site, to images associated with a particular term, images having particular characteristics (e.g., black and white, at least 10% green, etc.), or images having any combination of these and any additional criteria.

Figure 7:
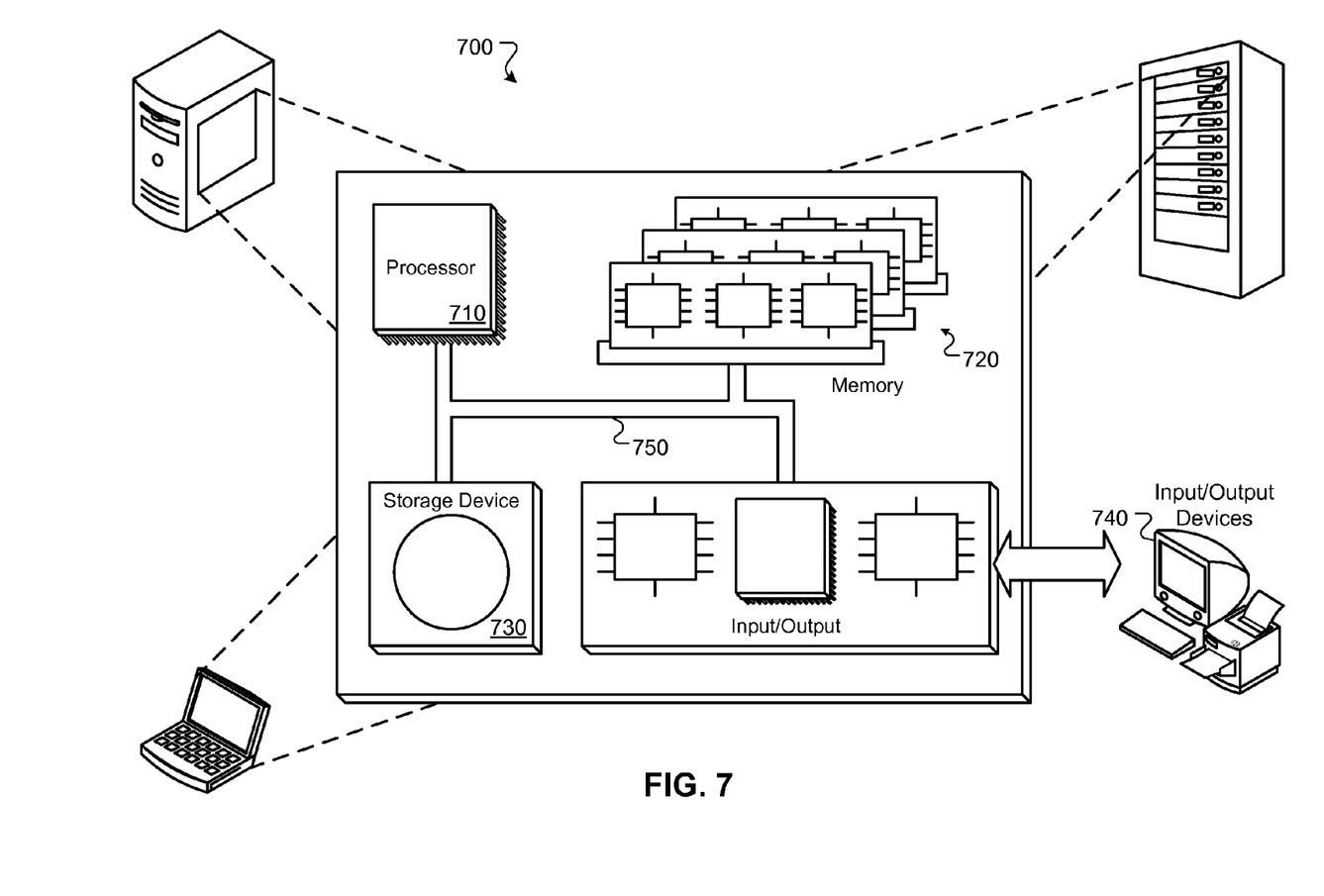
FIG. 7 is a block diagram illustrating a generic computer system.

FIG. 7 is a schematic diagram of a generic computer system 700. The system 700 can be used for practicing operations described in association with process 300. The system 700 can include a processor 710, a memory 720, a storage device 730, and input/output devices 740. Each of the components 710, 720, 730, and 740 are interconnected using a system bus 750. The processor 710 is capable of processing instructions for execution within the system 700. Such executed instructions can implement one or more components of image search engine 200, for example. In some implementations, the processor 710 is a single-threaded processor. In some other implementations, the processor 710 is a multi-threaded processor. The processor 710 is capable of processing instructions stored in the memory 720 or on the storage device 730 to display graphical information for a user interface on the input/output device 740.

The memory 720 is a computer readable medium such as volatile or non-volatile memory that stores information within the system 700. The memory 720 could store data structures representing image repository 214, for example. The storage device 730 is capable of providing persistent storage for the system 700. The storage device 730 may be a floppy disk device, a hard disk device, an optical disk device, or a tape device, or other suitable persistent storage means. The input/output device 740 provides input/output operations for the system 700. In some implementations, the input/output device 740 includes a keyboard and/or pointing device. In some other implementations, the input/output device 740 includes a display unit for displaying graphical user interfaces.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components and modules in the embodiments described above should not be understood as requiring such separation in all embodiments, and it should be understood that the described program components, modules and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
generating, by the computer system, initial scores for one or more terms and a plurality of images based on content that is associated with the plurality of images, wherein the initial scores indicate how closely the one or more terms are associated with the plurality of images in the content;

determining probabilities of navigating between images in the plurality of images, wherein the probabilities of navigating between images indicate how likely a user, who has viewed an image, is to perform an action that will cause another image to be displayed to the user;

determining, by the computer system, scores for the plurality of images and the one or more terms based on i) the probabilities of navigating between images and ii) the initial scores;

identifying a particular image from the plurality of images to associate with a particular term from the one or more terms based on the scores, wherein the content did not indicate an initial association between the particular image and the particular term based on a portion of the content that is associated with the particular image not including the particular term; and providing, by the computer system, information that identifies the particular image and the particular term.

2. The method of claim 1, wherein the determining the probabilities of navigating between images in the plurality of images comprises:
determining degrees of similarity between one or more pairs of images in the plurality of images; and
wherein the probabilities of navigating between images in the plurality of images are determined based on the degrees of similarity.

3. The method of claim 2, wherein determining degrees of similarity between the one or more pairs of images in the plurality of images comprises, for a particular pair of images, identifying and comparing one or more features of each image in the particular pair of images.

4. The method of claim 2, wherein the probabilities of navigating between images in the plurality of images are further determined based on quality metrics of the images in the plurality of images.

5. The method of claim 4, wherein the quality metrics comprise one or more of a degree of focus of a respective image, a number of colors in a respective image, or a degree of saturation of a respective image.

6. The method of claim 2, wherein the probabilities of navigating between images in the plurality of images are further determined based on one or more relationship metrics between electronic documents that include or link to the plurality of images.

7. The method of claim 2, wherein the probabilities of navigating between images in the plurality of images are further determined based on relationship metrics between electronic documents that include or link to the plurality of images and quality metrics of the images in the plurality of images.

8. The method of claim 2, wherein a first probability of navigating between a first pair of images is determined to be greater than a second probability of navigating between a second pair of images based on determining that i) a first degree of similarity for the first pair is greater than a first threshold degree of similarity and is less than a second threshold degree of similarity and ii) a second degree of similarity for the second pair is greater than or equal to the second threshold degree of similarity.

9. The method of claim 1, wherein the content that is associated with the plurality of images includes one or more of: metadata, filenames, textual content that is presented with one or more of the plurality of images in one or more electronic documents, anchor text for one or more links that link to one or more of the plurality of images, and linked-to content that is linked to by one or more of the plurality of images serving as anchors for links.

10. The method of claim 1, wherein a particular initial score from the initial scores is determined for the particular image based on a comparison of i) a number of times that the one or more terms occur in particular content that is associated with the particular image and ii) a number of times that the one or more terms occur in the content that is associated with the plurality of images.

11. The method of claim 1, wherein a particular initial score from the initial scores is determined for the particular image based on whether the one or more terms occurs in particular content that is associated with the particular image, the particular initial score being set to a first predefined value when the one or more terms occur in the content or to a second predefined value when the one or more terms do not occur in the content.

12. The method of claim 1, wherein
   a particular score from the scores is determined for the particular image based on a combination of probability adjusted scores for other images from the plurality of images; and
   the probability adjusted scores for the other images comprise initial scores for the other images weighted based on corresponding probabilities of navigating between the particular image and the other images.

13. A system comprising:
   one or more computing devices that each include one or more processors;
   an image terms module of the one or more computing devices to generate initial scores for one or more terms and a plurality of images based on content that is associated with the plurality of images, wherein the initial scores indicate how closely the one or more terms are associated with the plurality of images in the content;
   a probabilities module of the one or more computing devices to determine probabilities of navigating between images in the plurality of images wherein the probabilities of navigating between images indicate how likely a user, who has viewed an image, is to perform an action that will cause another image to be displayed to the user;
   a scoring and ranking module of the one or more computing devices to:
      determine scores for the plurality of images and the one or more terms based on i) the probabilities of navigating between images and ii) the initial scores, and
      identify a particular image from the plurality of images to associate with a particular term from the one or more terms based on the scores, wherein the content did not indicate an initial association between the particular image and the particular term based on a portion of the content that is associated with the particular image not including the particular term; and
   an image indexing module of the one or more computing devices to provide information that identifies the particular image and the particular term.

14. The system of claim 13, further comprising:
   an image similarity module of the one or more computing devices to determine degrees of similarity between one or more pairs of images in the plurality of images; and
   wherein the probabilities of navigating between images in the plurality of images are determined by the probabilities module using the degrees of similarity.

15. The system of claim 14, wherein the probabilities module is configured to determine the probabilities of navigating between the plurality of images further based on quality metrics of the images in the plurality of images.

16. The system of claim 14, wherein the probabilities module is configured to determine the probabilities of navigating between the plurality of images further based on one or more relationship metrics between electronic documents that include or link to the plurality of images.

17. The system of claim 14, wherein a first probability of navigating between a first pair of images is determined to be greater than a second probability of navigating between a second pair of images based on determining that i) a first degree of similarity for the first pair is greater than a first threshold degree of similarity and is less than a second threshold degree of similarity and ii) a second degree of similarity for the second pair is greater than or equal to the second threshold degree of similarity.

18. The system of claim 13, wherein a particular initial score from the initial scores is determined for the particular image based on a comparison of i) a number of times that the one or more terms occur in particular content that is associated with the particular image and ii) a number of times that the one or more terms occur in the content that is associated with the plurality of images.

19. The system of claim 13, wherein
   a particular score from the scores is determined for the particular image based on a combination of probability adjusted scores for other images from the plurality of images; and
   the probability adjusted scores for the other images comprise initial scores for the other images weighted based on corresponding probabilities of navigating between the particular image and the other images.

20. A computer program product, tangibly encoded on a non-transitory computer-readable medium, operable to cause a data processing apparatus to perform operations comprising:
   generating initial scores for one or more terms and a plurality of images based on content that is associated with the plurality of images, wherein the initial scores indicate how closely the one or more terms are associated with the plurality of images in the content;
   determining probabilities of navigating between images in the plurality of images, wherein the probabilities of navigating between images indicate how likely a user, who has viewed an image, is to perform an action that will cause another image to be displayed to the user;
   determining scores for the plurality of images and the one or more terms based on i) the probabilities of navigating between images and ii) the initial scores;
   identifying a particular image from the plurality of images to associate with a particular term from the one or more terms based on the scores, wherein the content did not indicate an initial association between the particular image and the particular term based on a portion of the content that is associated with the particular image not including the particular term; and
   providing information that identifies the particular image and the particular term.

* * * * *